(12) United States Patent
Curtis et al.

(10) Patent No.: US 10,067,892 B2
(45) Date of Patent: Sep. 4, 2018

(54) MICROCONTROLLER OR MICROPROCESSOR WITH DUAL MODE INTERRUPT

(71) Applicant: Microchip Technology Incorporated, Chandler, AZ (US)

(72) Inventors: Keith Curtis, Gilbert, AZ (US); Ashish Senapati, Tempe, AZ (US); Anthony Garcia, Maricopa, AZ (US); Vijay Sarvepalli, Chandler, AZ (US); Prashanth Pulipaka, Chandler, AZ (US); Kevin Kilzer, Chandler, AZ (US); David Forst, Queen Creek, AZ (US); Rob Kennedy, Chandler, AZ (US); Primo Castro, Chandler, AZ (US); Aaron Barton, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 183 days.

(21) Appl. No.: 15/060,553

(22) Filed: Mar. 3, 2016

(65) Prior Publication Data
US 2016/0259741 A1 Sep. 8, 2016

Related U.S. Application Data

(60) Provisional application No. 62/129,481, filed on Mar. 6, 2015.

(51) Int. Cl.
*G06F 13/24* (2006.01)
*G06F 13/26* (2006.01)
(Continued)

(52) U.S. Cl.
CPC ............. *G06F 13/26* (2013.01); *G06F 9/22* (2013.01); *G06F 9/3013* (2013.01); *G06F 9/30036* (2013.01); *G06F 13/24* (2013.01)

(58) Field of Classification Search
None
See application file for complete search history.

(56) References Cited

U.S. PATENT DOCUMENTS 5,367,676 A * 11/1994 Katori ................... G06F 9/4812
710/261
5,440,747 A * 8/1995 Kiuchi ................... G06F 1/3203
710/22

(Continued)

FOREIGN PATENT DOCUMENTS

EP 0977125 A1 2/2000 ............. G06F 1/32

OTHER PUBLICATIONS

International Search Report and Written Opinion, Application No. PCT/US2016/020942, 10 pages, dated May 24, 2016.

*Primary Examiner* — David E Martinez
(74) *Attorney, Agent, or Firm* — Slayden Grubert Beard PLLC

(57) ABSTRACT

A microcontroller has a CPU with at least one interrupt input coupled with an interrupt controller, a plurality of peripherals, and a mode register comprising at least one bit controlling an operating mode of the microcontroller. The microcontroller is configured to operate in a first operating mode wherein upon assertion of an interrupt by a peripheral of the microcontroller, the interrupt controller forwards an interrupt signal to the CPU and the peripheral sets an associated interrupt flag, wherein the interrupt causes the CPU to branch to a predefined interrupt address associated with the interrupt input. In a second operating mode, upon assertion of an interrupt by a peripheral of the microcontroller, the interrupt controller forwards an interrupt signal to
(Continued)

the CPU and the CPU receives additional interrupt information from the peripheral that generated the interrupt, wherein the additional interrupt information is used to generate a vector address.

31 Claims, 5 Drawing Sheets

(51) Int. Cl.
*G06F 13/32* (2006.01)
*G06F 9/22* (2006.01)
*G06F 9/30* (2018.01)

(56) References Cited

U.S. PATENT DOCUMENTS

| | | | | |
|---|---|---|---|---|
| 6,654,839 B1* | 11/2003 | Hashimoto | ............. | G06F 13/24 |
| | | | | 710/260 |
| 2009/0248935 A1* | 10/2009 | Ehrlich | .................. | G06F 13/26 |
| | | | | 710/264 |
| 2015/0019779 A1* | 1/2015 | Hirade | ................ | G06F 11/2231 |
| | | | | 710/260 |

* cited by examiner

MICROCONTROLLER OR MICROPROCESSOR WITH DUAL MODE INTERRUPT

CROSS-REFERENCE TO RELATED APPLICATIONS

This application claims priority to commonly owned U.S. Provisional Patent Application No. 62/129,481 filed Mar. 6, 2015; which is hereby incorporated by reference herein for all purposes.

TECHNICAL FIELD

The present disclosure relates to microprocessors or microcontrollers.

BACKGROUND

Microcontrollers are single chip systems on a chip comprising a central processing unit (CPU), memory, I/O interfaces and a plurality of different peripheral devices such as serial interfaces, analog-to-digital converters. PWM modulators, timers, etc. Generally, many applications do not require a lot of processing power. Thus to keep costs low, certain microcontrollers, such as 8-bit microcontrollers with a limited amount of program memory and data memory often are implemented without any type of external or internal interrupts or with a limited number of interrupts due to the fact that such interrupt logic requires significant real estate on a die. For example a baseline microcontroller family of a manufacturer may include devices that do not comprise any interrupt capability or only a single interrupt. A mid-range family may be designed to allow for a single interrupt and an associated interrupt controller that receives a plurality of interrupts and generates an output signal fed to the single interrupt input of the CPU. Both of these microcontroller types may comprise a CPU with single interrupt input wherein when asserted causes the program execution to finish a currently pending instruction and then branch to a defined address (interrupt vector), e.g. address 0004h. A higher end family of microcontrollers of the manufacturer may include devices with a CPU that has two interrupt inputs one being assigned a low priority and one being assigned a high priority as well as an interrupt controller for distributing interrupts from various sources to these two interrupt inputs of the CPU.

The present application thus focuses on microcontrollers comprising a central processing unit that has a limited number of interrupts, e.g. a single or two interrupt inputs and associated interrupt controller with a limited interrupt functionality. In many applications this may still not be sufficient and a higher end device, for example a 16-bit or 32-bit microcontroller must be chosen due to the fact that the interrupt capabilities of the 8-bit microcontrollers are too limiting. Also, if such microcontrollers are intended to have an increased number of peripherals the central processing unit may not be able to support an associated interrupt function due to the limited interrupt functionality.

SUMMARY

Hence, there exists a need for a microcontroller with an improved or more flexible interrupt handling.

According to an embodiment, a microcontroller may comprise a central processing unit comprising at least one interrupt input, an interrupt controller configured to provide at least one interrupt signal to the at least one interrupt input of the central processing unit, a plurality of peripherals coupled with the central processing unit and the interrupt controller, and a mode register comprising at least one bit controlling an operating mode of the microcontroller, wherein the microcontroller is configured to operate in a first and in a second mode, wherein in the first operating mode upon assertion of an interrupt by a peripheral of the microcontroller, the interrupt controller forwards an interrupt signal to the central processing unit and the peripheral sets an associated interrupt flag, wherein the interrupt causes the central processing unit to branch to a predefined interrupt address associated with the interrupt input, wherein in the second operating mode upon assertion of an interrupt by a peripheral of the microcontroller, the interrupt controller forwards an interrupt signal to the central processing unit and the central processing unit receives additional interrupt information from the peripheral that generated the interrupt, wherein the additional interrupt information is used to generate a vector address.

According to a further embodiment, in the second operating mode, after receiving an interrupt, the central processing unit can be configured to perform a context save before entering a service routine and wherein a register of the central processing unit receives data configured to identify an interrupt source after said context save. According to a further embodiment, the register can be a working register of the arithmetic logic unit. According to a further embodiment, said additional information provided by a peripheral that generated the interrupt can be used to shift a constant value and wherein the shifted constant value is moved into the register. According to a further embodiment, said additional information can be an interrupt number which is directly stored in a working register of the CPU. According to a further embodiment, in the second operating mode, a base register can be provided that stores a base address and an offset address depending on an interrupt source is forwarded to the central processing unit, wherein an interrupt vector is generated by adding the vector address to the base address stored in the base register. According to a further embodiment, in the second mode, the microcontroller can be programmed to provide for an interrupt service routine that evaluates the content of the working register to branch to a respective service routine associated with an interrupt source that generated the interrupt. According to a further embodiment, in the first mode, the microcontroller can be programmed to provide for an interrupt service routine that polls an interrupt flag in a special function register to determine an interrupt source that generated the interrupt. According to a further embodiment, the central processing unit may comprise only a single interrupt input. According to a further embodiment, the central processing unit may comprise only a first and a second interrupt input, wherein the first interrupt input has a higher priority than the second interrupt input. According to a further embodiment, when a higher priority interrupt interrupts a lower priority service routine, the higher priority interrupt can be configured to clear a lower priority interrupt and an associated service routine returns directly to a main code without returning through the low priority service routine. According to a further embodiment, when a higher priority interrupt interrupts a lower priority service routine, the higher priority interrupt can be configured to return directly to the lower priority interrupt service routine without returning to a main code. According to a further embodiment, interrupt controller may comprise controllable logic to enable interrupts received from the peripherals.

According to another embodiment, a method for providing interrupt functionality within a microcontroller comprising a central processing unit comprising at least one interrupt input and an interrupt controller configured to provide at least one interrupt signal to the at least one interrupt input of the central processing unit, may comprise the steps of: setting a first or a second operating mode; receiving an interrupt by the interrupt controller; and when operating in the first operating mode, forwarding by the interrupt controller an interrupt signal to the central processing unit and setting an associated interrupt flag, wherein the interrupt causes the central processing unit to branch to a predefined interrupt address associated with the interrupt input; and when operating in the second operating mode, forwarding by the interrupt controller an interrupt signal to the central processing unit and receiving by the central processing unit additional interrupt information from the peripheral that generated the interrupt, wherein the additional interrupt information is used to generate a vector address.

According to a further embodiment of the method, in the second operating mode, after receiving an interrupt, the method may perform a context save before entering a service routine and receiving additional information by the central processing unit configured to identify an interrupt source after said context save and storing said additional information or data derived from said additional information in a register. According to a further embodiment of the method said additional information can be an interrupt number which is directly stored in a working register of the CPU. According to a further embodiment of the method, the method may further comprise the step of calculating an address after entering the service routine using said data and branching to said address to service said interrupt. According to a further embodiment of the method said data may be used to shift a constant value and wherein the shifted constant value is moved into the register. According to a further embodiment of the method, the method may further comprise the step of using said shifted value as an offset address to branch to an address to service said interrupt. According to a further embodiment of the method, in the second operating mode a base register may be provided that stores a base address and an offset address depending on an interrupt source is forwarded to the central processing unit, and generating an interrupt vector by adding the vector address to the base address stored in the base register. According to a further embodiment of the method, in the second operating mode, an interrupt service routine may evaluate the content of the working register to branch to a respective address providing instructions associated with an interrupt source that generated the interrupt. According to a further embodiment of the method, in the first mode, an interrupt service routine may poll an interrupt flag in a special function register to determine an interrupt source that generated the interrupt. According to a further embodiment of the method, the central processing unit may comprise only a single interrupt input. According to a further embodiment of the method, the central processing unit may comprise only a first and a second interrupt input, wherein the first interrupt input has a higher priority than the second interrupt input. According to a further embodiment of the method, when a higher priority interrupt interrupts a lower priority service routine, the higher priority interrupt may be configured to clear a lower priority interrupt and an associated service routine may return directly to a main code without returning through the low priority service routine. According to a further embodiment of the method, when a higher priority interrupt interrupts a lower priority service routine, the higher priority interrupt may be configured to return directly to the lower priority interrupt service routine without returning to a main code.

According to yet another embodiment, a microcontroller may comprise a central processing unit comprising at least one interrupt input and a register coupled with an arithmetic logic unit; an interrupt controller configured to provide at least one interrupt signal to the at least one interrupt input of the central processing unit; a plurality of peripherals coupled with the central processing unit and the interrupt controller; wherein upon assertion of an interrupt by a peripheral of the microcontroller, the interrupt controller forwards an interrupt signal to the central processing unit and the central processing unit receives additional interrupt information from the peripheral that generated the interrupt, wherein the additional interrupt information or data derived from the additional interrupt information is stored in said register.

According to a further embodiment of the above microcontroller, after receiving an interrupt, the central processing unit may be configured to perform a context save before entering a service routine and the register may receive the additional interrupt information after said context save. According to a further embodiment of the above microcontroller, said additional information may be used to shift a constant value and wherein the shifted constant value is moved into the register. According to a further embodiment of the above microcontroller, said additional information can be an interrupt number which is directly stored in a working register of the CPU. According to a further embodiment of the above microcontroller, the microcontroller can be programmed to provide for an interrupt service routine that evaluates the content of the working register to branch to a respective service routine associated with an interrupt source that generated the interrupt.

DETAILED DESCRIPTION

Figure 1:
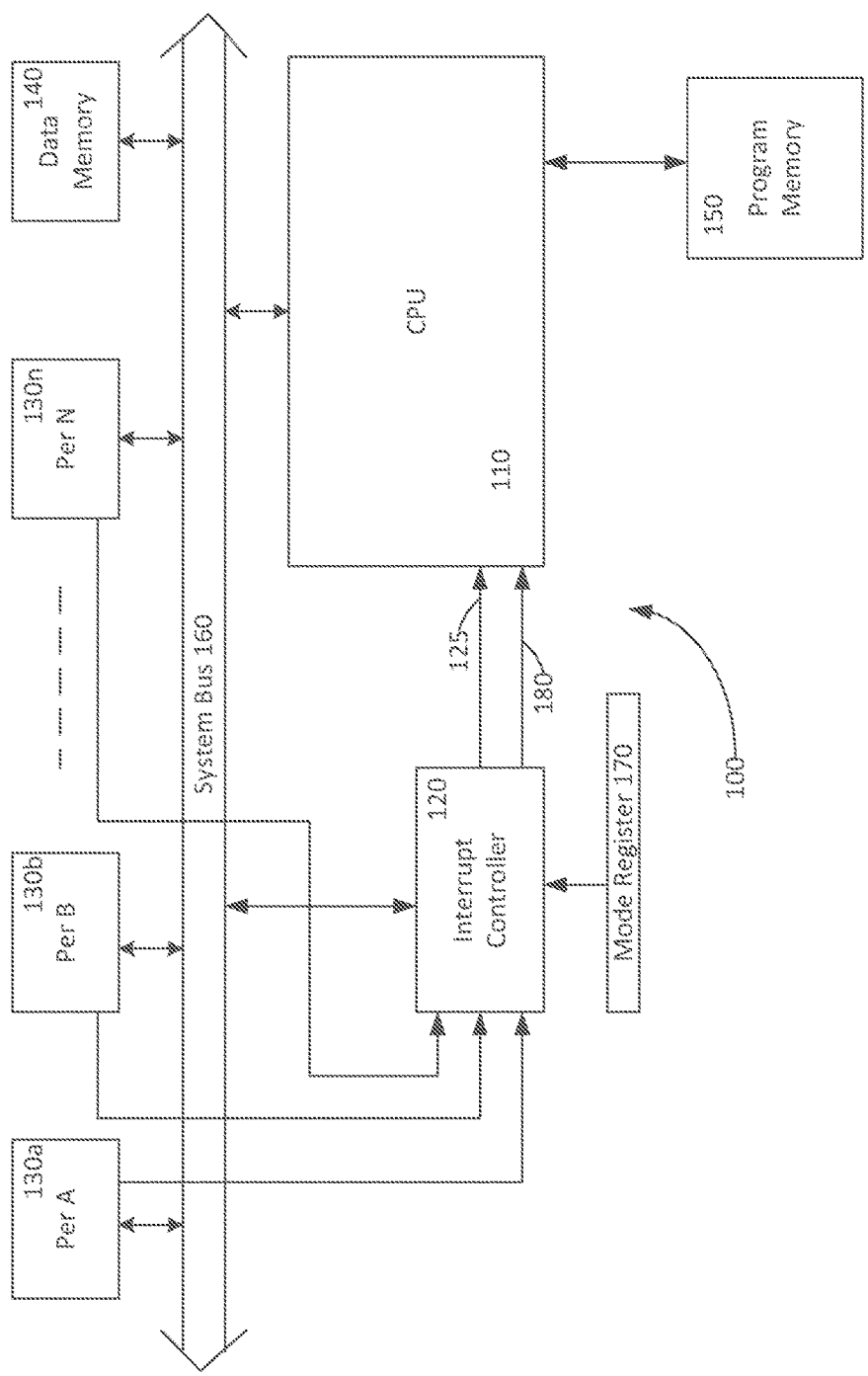
FIG. 1 shows a block diagram of a microcontroller according to an embodiment.

According to various embodiments, a vectored interrupt system can be created that is compatible with an existing design of microcontrollers. The features discussed below are not limited to 8-bit microcontrollers but may also apply to 16-bit or 32-bit microcontrollers if such devices comprise an insufficient interrupt control architecture. According to various embodiments, an existing interrupt handling is maintained and a second mode of operation is provided. In the first operating mode, such a microcontroller having a single interrupt input may operate as originally designed, e.g.

branch to the single pre-defined interrupt vector, e.g., address 0004h. In a second operating mode, the microcontroller may use a plurality of interrupt vectors associated with a single interrupt input.

Present existing designs of non-vectored microcontroller systems may be insufficient for an expanded number of peripherals which may be made possible by new core architecture designs. A vectored interrupt system may allow for integrating such peripherals with respect to individual interrupt functionality.

In particular, microcontrollers manufactured by the Assignee of the present application, such as microcontrollers from the PIC10/12/16 family all use a single interrupt vector at location 0004x in the program memory. The more advanced microcontrollers from the PIC 18 family use a dual priority vectored system.

Assignee's PIC16 family of microcontrollers does not provide for vectors. The more advanced PIC18 family does not have a software solution and does not have supervisory interrupt control. Moreover, the more advanced PIC18 family as well as the PIC 16 family need to trim latency in particular due to the sheer number of interrupt sources on some of the microcontrollers. The PIC16/18 family both have blocks to boot loader implementations.

The existing conventional PIC18 vectored interrupt system is expanded according to various embodiments with a base address register that allows the movement of the vector table to support boot loaders.

According to an embodiment, the latency time can be trimmed by removing return to main instructions, e.g., from a High interrupt transitioning to another pending High interrupt, a Low interrupt transitioning to another pending Low interrupt, and a High interrupt transitioning to a Low interrupt. In other words, a return from interrupt instruction can be removed and the system jumps directly to the next pending interrupt routine.

Context for both High and Low priority interrupts can be made accessible for RTOS support.

According to other embodiments, for systems that use high priority timer interrupts to watch dog low priority communication peripherals, the ability to clear interrupted low priority interrupts without using the global interrupt enable bit GIE is provided. According to various embodiments, a POP instruction may be added to the core if not already present to remove a respective return vector from the Low priority interrupt.

According to yet another embodiment, a context save for both Low and High priority interrupts are visible through context registers. Register space is conserved through the context control register that allow toggling between low and high access. The improved microcontrollers have the ability to clear low context on command to support watch dog functions.

The solution according to some embodiments, are backward compatible with legacy mode option to interrupt to location 0004x. The Mode is expanded by the addition of function that loads interrupt number into W register prior to branch to 0004x According to some embodiments, such a dual mode vector interrupt may be implemented with 2 levels of priority that employs both a straight vector table and a vector number for software based systems.

FIG. 1 shows a block diagram of a microcontroller 100 with a CPU 110 having a single interrupt input. The CPU 110 is coupled with a plurality of peripherals 130a . . . n via a system bus 160. The CPU 110 can be designed according to the Harvard architecture as shown having a separate data memory 140 and program memory 150. However, the architecture may also use the von Neumann architecture with a unified memory space.

Data memory 140 may be accessible through the system bus and program memory 150 may have its own bus. However, other designs may be chosen. Some of the peripherals 130a . . . n or all of them may generate an interrupt signal which is fed to an interrupt controller 120. The interrupt controller may generate a single interrupt signal which is fed to the respective input of the CPU 110.

Figure 2:
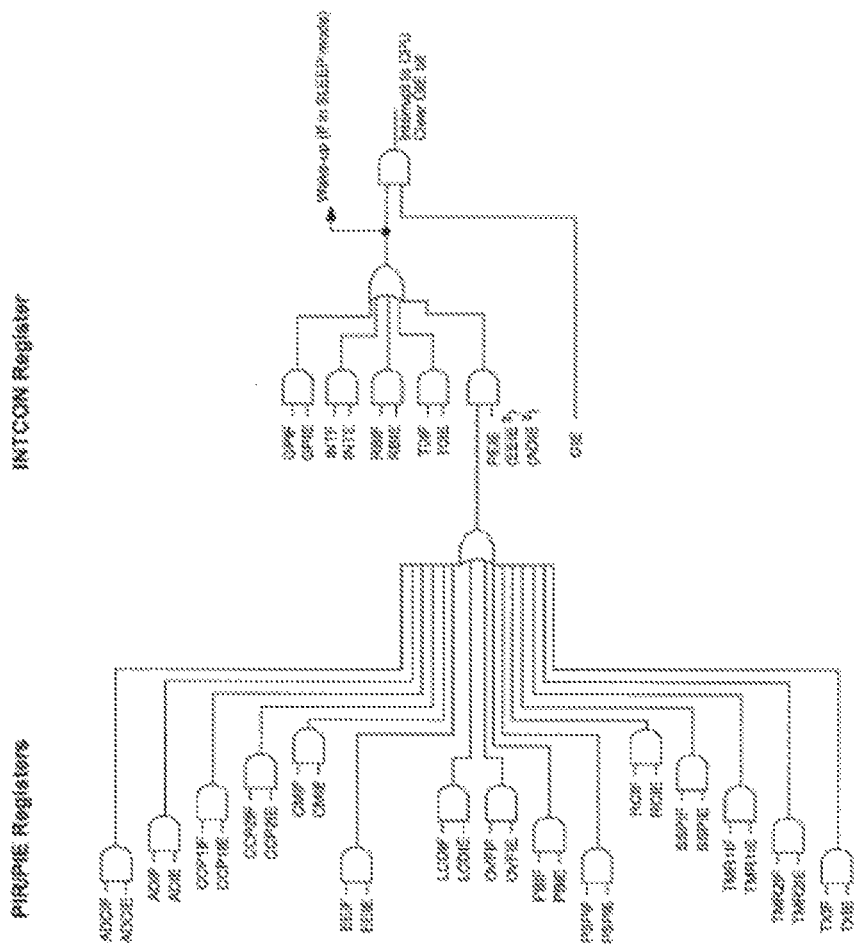
FIG. 2 shows an embodiment of interrupt controller logic.

FIG. 2 shows a block diagram of a possible implementation for an interrupt controller 120 operating in the first mode. A plurality of special function registers may be provided which allows to individually enable or disable one of a plurality of interrupts and store associated interrupt flags which may be generated by various peripherals of the microcontroller as shown on the left side in FIG. 2. The right side of FIG. 2 shows a further interrupt control register bit that allows to generally enable or disable all interrupts, e.g. via the global interrupt enable bit GIE. The interrupt control register may comprise further bits to control system interrupts as shown in the center of FIG. 2. A separate enable/disable control for all peripheral interrupts is handled by the PETE bit. An external interrupt is controlled by the enable bit INTE and associated flag INTF. Furthermore, an external port change sensing control is provided by the RB port change interrupt enable bit and associated flag RBIF. This functionality may be expanded to other ports according to other embodiments. Finally the timer 0 overflow interrupt may be handled on this level. In this embodiment, INTE/INTF, RBIE/RBIF, and T0IE/T0IF are "system interrupts", however, according to other embodiments, all interrupts may treated as peripheral interrupts without a specific PEIE enablement bit. These interrupt architectures allow for a plurality of interrupts using a single interrupt input at the CPU. To accomplish this, the interrupt routine must query the respective flags to distinguish between the various sources. For the CPU every interrupt looks the same because only a single interrupt input is provided. However, each interrupt source may set an associated flag when they generate an interrupt. Thus, the interrupt handler software must check these flags in the interrupt handling routine to determine who asserted the interrupt. Furthermore, one the interrupt has been handled, the service routine generally resets the respective flag. Other logic may be used to allow handling of multiple interrupt sources with a single interrupt input. FIG. 2 shows merely one possible solution as it is implemented in many mid-range microcontrollers manufactured by the assignee of the present application.

Figure 3:
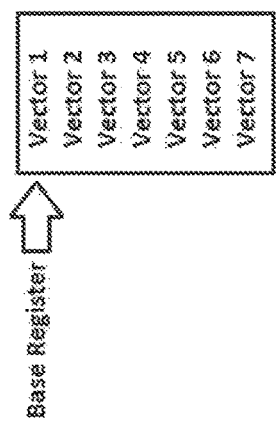
FIG. 3 shows an embodiment of how a vector address can be generated.

A vectored system is shown in FIG. 3. Each interrupt provides a different vector and the source of the interrupt is added to a base register to select the appropriate interrupt vector. Thus, contrary to the interrupt handling described above where only a single interrupt vector, e.g. vector 0004h is generated, such a system requires that additional information, e.g., a vector offset, is generated when the interrupt signal is generated. While still using only a single interrupt input at the CPU, the CPU would now branch to different interrupt vectors depending on the additional information provided to the CPU. Different techniques using such additional information to accomplish branching without polling any flags will be explained below in more detail. A CPU can either directly generate a respective vector that replaces the fixed single interrupt vector or use the fixed single interrupt vector and provide a software branching with or without hardware assistance. However, in this second operating mode, there is no polling of interrupt flags necessary which can reduce software overhead significantly.

A mode control register 170 can be provided that allows the interrupt controller and CPU to operate in a first mode (compatibility mode) in which only a single interrupt signal is generated and the software must poll the interrupt flags as shown in FIG. 1. According to various embodiments, a second mode is now provided which forwards the interrupt information through additional data lines 180 as shown in FIG. 1. The interrupt information can be for example the vector offset or the actual interrupt number or any other information that allows for implementation of an interrupt vector system. The interrupt information, such as for example the interrupt number can be provided by the peripheral 130a . . . n. Thus, for example as shown in FIG. 1, each coupling between a peripheral 130a . . . n and the interrupt controller 120 may include additional lines that provide for the interrupt information such as the interrupt number. Alternatively, such information can be forwarded through the system bus 160 to the interrupt controller 120 or directly to the CPU 110. In one embodiment, a vector offset is automatically added to the single fixed interrupt vector address. Thus, the system has different entry points for each interrupt. The offset may be set such that enough instruction can be placed between two adjacent interrupt numbers to branch to associated service routines. Alternatively, the interrupt information is directly loaded into a register, e.g. a special function register or the working register of the arithmetic logic unit. This solution, allows to use this data in a software branching performed immediately after the service routine at the fixed interrupt vector address is entered as will be explained in more detail below.

Figure 4:
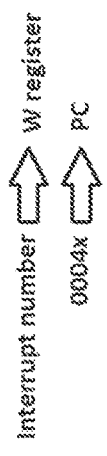
FIG. 4 shows an embodiment of how a vector address can be moved to a working register.

FIG. 4 shows the second mode according to one embodiment in which the general interrupt vector is in the traditional location, e.g. at address 0004h, but the interrupt number is transferred into a working register W of the CPU after context save to provide a backward compatible solution, plus the ability to build a software based solution. The context save is only required to be prior to the additional information transfer if the additional information such as the interrupt number is transferred into a register that carries information used by other routines, such as a working register. The working register will be overwritten and therefore it is amongst other special function registers part of the context that must be saved when entering an interrupt service routine. Thus, after entry into the interrupt service routine, the working register includes the source of the interrupt which allows the following service routine to branch to the correct service instructions for that specific source. This could be accomplished by a vector that is calculated from the interrupt number or by simply querying the working register and branching to the respective routine. This specific solution of a vectored interrupt system has the benefit of being compatible with the existing interrupt system of microcontrollers manufactured by the Assignee. Alternatively, this information could be used later in a common interrupt service routine that first executes instructions common to all assigned interrupts and then branches off to individual routines. Other software solutions are possible using the information stored in the register.

Figure 5:
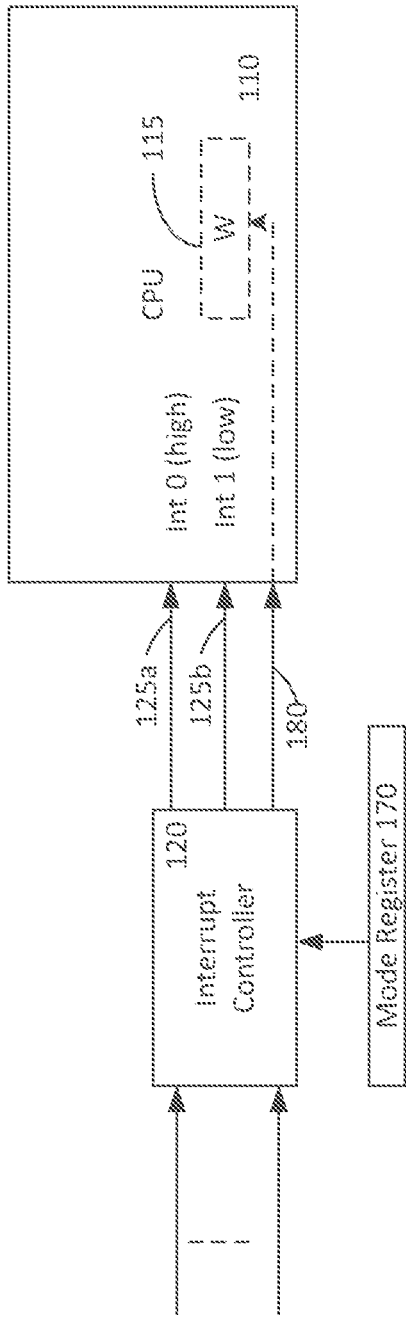
FIG. 5 shows an embodiment of a microcontroller in which additional interrupt information is moved to a register.

FIG. 5 shows a microcontroller with two interrupt inputs 125a and 125b. The first input 125a may be assigned a high priority and the second input 125b may be assigned a low priority. Thus, the high priority interrupt at input 125a is capable of interrupting a pending low priority interrupt routine whereas a low priority interrupt at input 125b cannot interrupt a pending high priority interrupt routine. The system also has the ability to stay in interrupt if there are pending interrupts of the same priority or higher. According to various embodiments, such a system can be enhanced in the same way as described above by allowing each interrupt input to also receive additional information, e.g. an interrupt number, through line(s) 180 when operating in the second mode. Hence, the enhancement described above is not limited to a system with a CPU having a single interrupt input but can be used with a CPU with more than one interrupt wherein each interrupt or at least one of them is enhanced as described above.

According to one embodiment, the enhancement may further be used in a single interrupt mode which only uses the second mode as described above. This embodiment allows for a reduced hardware solution. According to this embodiment, the additional information is directly loaded into a register of the CPU, preferably a working register of the ALU. This solution provides for the flexibility of a vectored interrupt system without the requirement of hardware that must decode the information and automatically set the respective interrupt vector.

Figure 6:
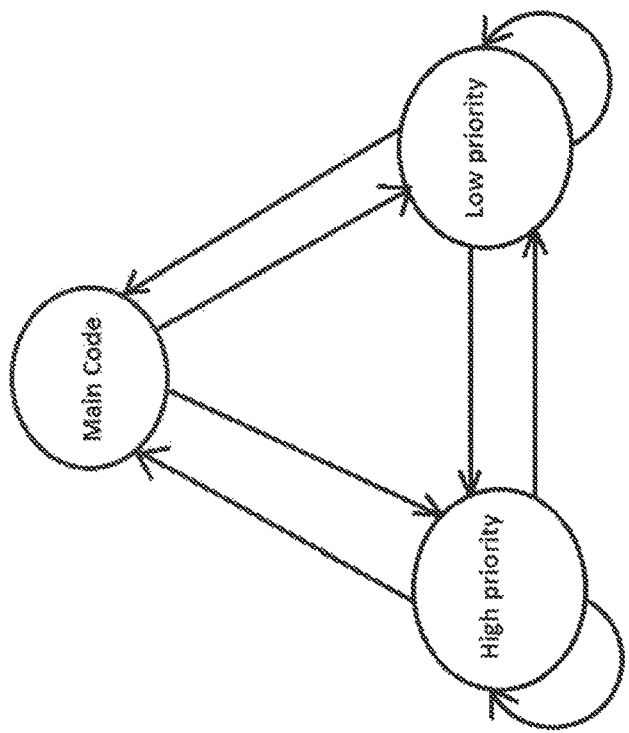
FIG. 6 shows a state diagram of a system using high and low priority interrupts.

The state diagram in FIG. 6 shows the various transitions that are possible in such a two-priority system. Such a system may also have the ability of a higher priority interrupt to clear a lower priority interrupt and return directly to the main code without returning through the low priority.

FIG. 5 indicates that the additional information is loaded directly into the working register 115 of the arithmetic logic unit (ALU) within the CPU. Such a transfer can be made directly after a context safe has been made which saves the content of the working register according to one embodiment. A context safe automatically transfers the content of certain registers onto a stack or into shadow registers without software overhead. According to other embodiments, the transfer into a different register, e.g. a dedicated register that is not used otherwise, can be made in parallel with the context safe. Therefore, the additional information does not need to be transferred into the working register but could also be transferred into another dedicated special function register according to other implementations. However, the use of a working register is beneficial as such a register can be directly used to manipulate an address. The same accounts for any other CPU register and therefore depends on the CPU architecture.

Figure 7:
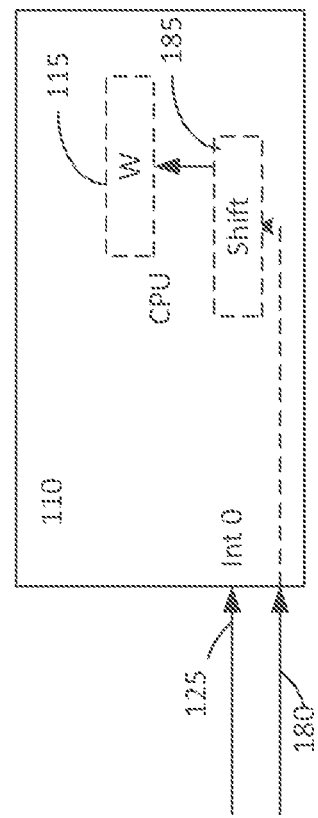
FIG. 7 shows another embodiment of a microcontroller in which additional interrupt information is moved to a register.
Figure 8:
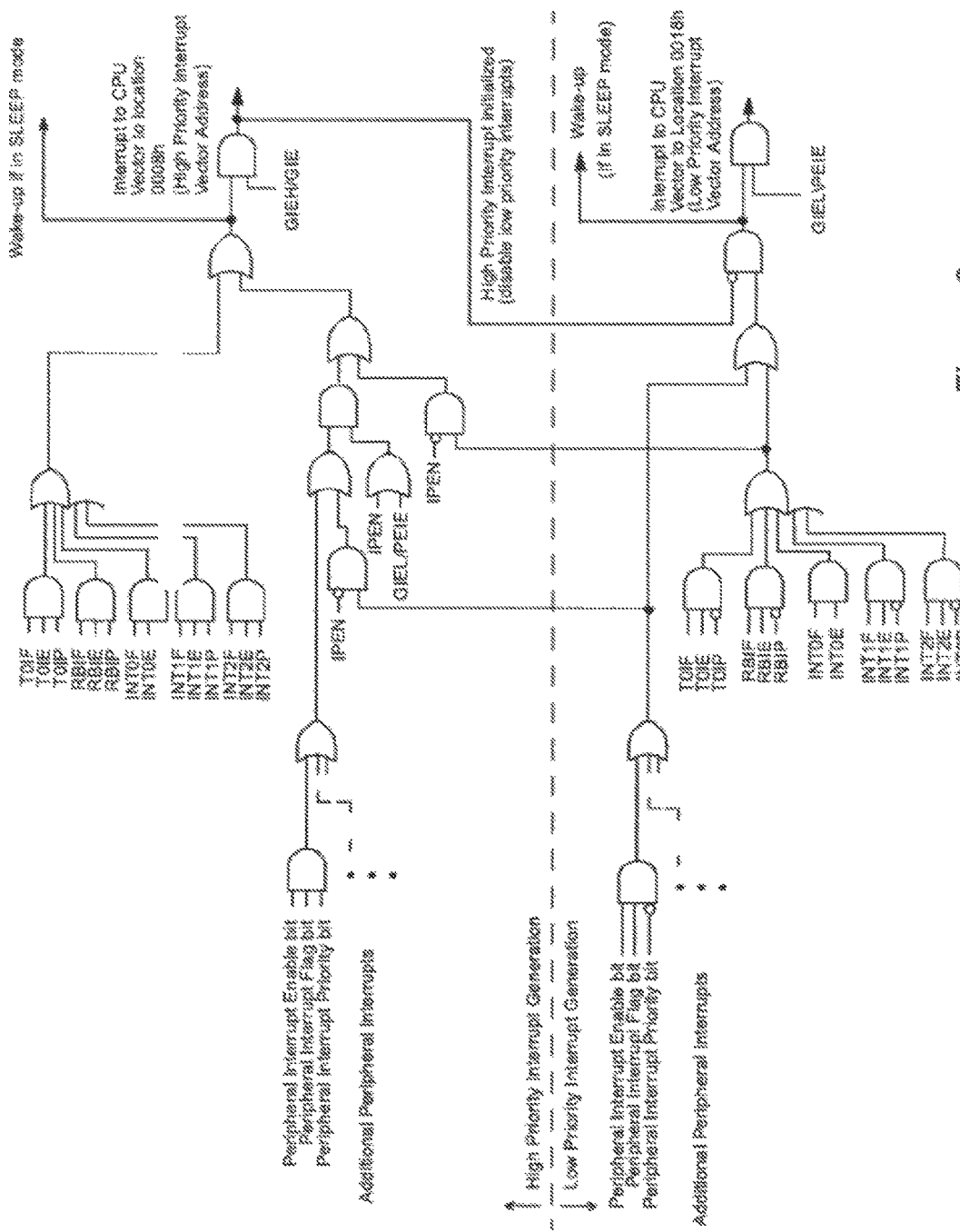
FIG. 8 shows another embodiment of interrupt controller logic.

FIG. 7 shows yet another embodiment of a single operating mode or an operating mode with two modes. Here the additional information such as the interrupt number controls a shift register 185 which is, for example, preset with 0001h or 0002h or any other suitable offset number, the shifted result is then directly moved to the working register. This solution provides an offset value that can be used directly to access a jump table without the need to execute further address calculation instructions within the interrupt service routine. As shown in FIG. 7, only a single interrupt input Int 0 is provided. However, this design can also be applied to a CPU with more than one interrupt input.

According to other implementations of the two operating modes, as mentioned above, the vector does not need to be calculated by software within the interrupt service routine. While such a solution provides for backward compatibility, other architectures might allow a hardware calculation of the vector that is directly applied when the interrupt is received thereby allowing to directly jump to various vector addresses depending on the provided vector address.

The system is designed to work within 8-bit architecture, in particular those, designed by the Assignee of the present application. However, the proposed implementations may also apply to other 8-bit systems as well as 16-bit or 32-bit systems that use corresponding interrupt logic.

The invention claimed is:

1. A microcontroller comprising:
a central processing unit comprising at least one interrupt input;
an interrupt controller configured to provide at least one interrupt signal to the at least one interrupt input of the central processing unit;
a plurality of peripherals coupled with the central processing unit and the interrupt controller;
a mode control register comprising at least one bit controlling an operating mode of the microcontroller, wherein the microcontroller is configured to operate in a first and in a second mode, wherein in the first operating mode upon assertion of an interrupt by a peripheral of the microcontroller, the interrupt controller forwards an interrupt signal to the central processing unit and the peripheral sets an associated interrupt flag, wherein the interrupt causes the central processing unit to branch to a predefined interrupt address associated with the interrupt input;
and wherein in the second operating mode upon assertion of an interrupt by a peripheral of the microcontroller, the interrupt controller forwards an interrupt signal to the central processing unit and the central processing unit receives additional interrupt information from the peripheral that generated the interrupt, wherein the additional interrupt information is directly stored in another register of the central processing unit and used to generate a vector address.

2. The microcontroller according to claim 1, wherein in the second operating mode, after receiving an interrupt, the central processing unit is configured to perform a context save before entering a service routine and wherein the another register of the central processing unit receives data configured to identify an interrupt source after said context save.

3. The microcontroller according to claim 2, wherein said additional interrupt information provided by a peripheral that generated the interrupt is used to shift a constant value and wherein the shifted constant value is moved into the another register.

4. The microcontroller according to claim 2, wherein said additional interrupt information is an interrupt number which is directly stored in a working register of the CPU.

5. The microcontroller according to claim 1, wherein the another register is a working register of an arithmetic logic unit of the central processing unit.

6. The microcontroller according to claim 1, wherein in the second operating mode, a base register is provided that stores a base address and an offset address depending on an interrupt source is forwarded to the central processing unit, wherein an interrupt vector is generated by adding the vector address to the base address stored in the base register.

7. The microcontroller according to claim 1, wherein in the second mode, the microcontroller is programmed to provide for an interrupt service routine that evaluates the content of the another register to branch to a respective service routine associated with an interrupt source that generated the interrupt.

8. The microcontroller according to claim 1, wherein in the first mode, the microcontroller is programmed to provide for an interrupt service routine that polls an interrupt flag in a special function register associated with a peripheral that caused the interrupt to determine an interrupt source.

9. The microcontroller according to claim 1, wherein the central processing unit comprises only a single interrupt input.

10. The microcontroller according to claim 1, wherein the central processing unit comprises only a first and a second interrupt input, wherein the first interrupt input has a higher priority than the second interrupt input.

11. The microcontroller according to claim 10, wherein when a higher priority interrupt interrupts a lower priority service routine, the higher priority interrupt is configured to clear a lower priority interrupt and an associated service routine returns directly to a main code without returning through the low priority service routine.

12. The microcontroller according to claim 10, wherein when a higher priority interrupt interrupts a lower priority service routine, the higher priority interrupt is configured to return directly to the lower priority interrupt service routine without returning to a main code.

13. The microcontroller according to claim 1, wherein interrupt controller comprises controllable logic to enable interrupts received from the peripherals.

14. A method for providing interrupt functionality within a microcontroller comprising a plurality of peripherals, a central processing unit comprising at least one interrupt input, and an interrupt controller configured to provide at least one interrupt signal to the at least one interrupt input of the central processing unit, the method comprising:
setting a first or a second operating mode;
receiving an interrupt by the interrupt controller from one of the plurality of peripherals; and
when operating in the first operating mode, forwarding by the interrupt controller an interrupt signal to the central processing unit and setting an associated interrupt flag by one of the plurality of peripherals, wherein the interrupt causes the central processing unit to branch to a predefined interrupt address associated with the interrupt input;
and when operating in the second operating mode, forwarding by the interrupt controller an interrupt signal to the central processing unit and storing additional interrupt information received from the one of the plurality of peripherals that generated the interrupt directly into a register of the CPU, wherein the additional interrupt information is used to generate a vector address.

15. The method according to claim 14, wherein in the second operating mode, after receiving an interrupt, performing a context save before entering a service routine and retrieving the additional interrupt information from the register by the central processing unit to identify an interrupt source after said context save.

16. The method according to claim 15, wherein said additional interrupt information is an interrupt number which is directly stored in a working register of the CPU.

17. The method according to claim 15, further comprising:
calculating an address after entering the service routine using data from said register and branching to said address to service said interrupt.

18. The method according to claim 15, wherein data from said additional interrupt information is used to shift a constant value and wherein the shifted constant value is moved into the register.

19. The method according to claim 18, further comprising: using said shifted value as an offset address to branch to an address to service said interrupt.

20. The method according to claim 14, wherein in the second operating mode a base register is provided that stores a base address and an offset address depending on an interrupt source is forwarded to the central processing unit, and generating an interrupt vector by adding the vector address to the base address stored in the base register.

21. The method according to claim 14, wherein in the second operating mode, an interrupt service routine evaluates the content of the working register to branch to a respective address providing instructions associated with an interrupt source that generated the interrupt.

22. The method according to claim 14, wherein in the first operating mode, an interrupt service routine polls said interrupt flag to determine an interrupt source that generated the interrupt.

23. The method according to claim 14, wherein the central processing unit comprises only a single interrupt input.

24. The method according to claim 14, wherein the central processing unit comprises only a first and a second interrupt input, wherein the first interrupt input has a higher priority than the second interrupt input.

25. The method according to claim 24, wherein when a higher priority interrupt interrupts a lower priority service routine, the higher priority interrupt is configured to clear a lower priority interrupt and an associated service routine returns directly to a main code without returning through the low priority service routine.

26. The method according to claim 24, wherein when a higher priority interrupt interrupts a lower priority service routine, the higher priority interrupt is configured to return directly to the lower priority interrupt service routine without returning to a main code.

27. A microcontroller comprising:
   a central processing unit comprising at least one interrupt input and a register coupled with an arithmetic logic unit;
   an interrupt controller configured to provide at least one interrupt signal to the at least one interrupt input of the central processing unit;
   a plurality of peripherals coupled with the central processing unit and the interrupt controller;
   wherein upon assertion of an interrupt by a peripheral of the microcontroller, the interrupt controller forwards an interrupt signal to the central processing unit and the central processing unit receives additional interrupt information from the peripheral that generated the interrupt, wherein the additional interrupt information or data derived from the additional interrupt information is stored in said register.

28. The microcontroller according to claim 27, wherein after receiving an interrupt, the central processing unit is configured to perform a context save before entering a service routine and wherein the register receives the additional interrupt information after said context save.

29. The microcontroller according to claim 27, wherein said additional interrupt information is used to shift a constant value and wherein the shifted constant value is moved into the register.

30. The microcontroller according to claim 27, wherein said additional interrupt information is an interrupt number which is directly stored in a working register of the CPU.

31. The microcontroller according to claim 27, wherein the microcontroller is programmed to provide for an interrupt service routine that evaluates the content of the register to branch to a respective service routine associated with an interrupt source that generated the interrupt.

* * * * *